Aug. 28, 1951  J. FEINSTEIN ET AL  2,565,486
PULSE DURATION SEPARATION SYSTEM
Filed Nov. 10, 1947

INVENTORS
IRWIN H. FRANZEL
JOSEPH FEINSTEIN
BY
Robert Harding Jr.
ATTORNEY

Patented Aug. 28, 1951

2,565,486

UNITED STATES PATENT OFFICE 2,565,486

PULSE DURATION SEPARATION SYSTEM

Joseph Feinstein and Irwin H. Franzel, Brooklyn, N. Y., assignors to International Standard Electric Corporation, New York, N. Y., a corporation of Delaware Application November 10, 1947, Serial No. 785,171

3 Claims. (Cl. 250—27)

This invention relates to a pulse separation system and particularly one for separating pulses according to their duration. Pulse separation systems for separating pulses according to their width (duration) have many uses. For example, in multichannel communication the pulses of the various channels may be interleaved and in order to distinguish the pulses of the channels from each other these pulses may be given different widths or durations. At the receiving end of the system or at one of the drop channel relay stations the pulses may be then separated according to their widths.

An object of the present invention is the provision of an improved pulse width separation system utilizing cathode ray tubes. In accordance with a feature of the present invention, use is made of a cathode ray tube having separate target elements arranged at different deflection angles of the beam and the beam is swept successively across the target elements under the control of the incoming pulses.

In accordance with another feature of the present invention the varying width pulses are differentiated to produce pulses of two polarities, one corresponding to the leading edges of the varying width pulses and the other corresponding to the trailing edges of the varying width pulses. The pulses of the first polarity are used to trigger a normally quiescent sawtooth generator which may be in the form of a pulse-triggered relaxation oscillator. The sawtooth output is used to sweep the beam across the various target elements. The beam, however, is normally biased to cut off, and is only turned on by the pulses of said other polarity. Thus the particular target element struck by the beam, when it is turned on varies in accordance with the width of the varying width pulse.

The above-mentioned and other features and objects of this invention and the manner of attaining them will become more apparent and the invention itself will be best understood, by reference to the following description of an embodiment of the invention taken in conjunction with the accompanying drawings, wherein.

Referring now particularly to said figures, it is assumed for the purposes of illustration that there are a train of random pulses, such as are represented in curve $a$, which may differ in amplitude and width. For the sake of simplicity it is further assumed that these are to be separated into only four channels, A, B, C, D with pulses A1, B1, C1, and D1, having widths characteristic of their respective channels. These pulses are fed to the pulse separator of Fig. 1.

Figure 1:
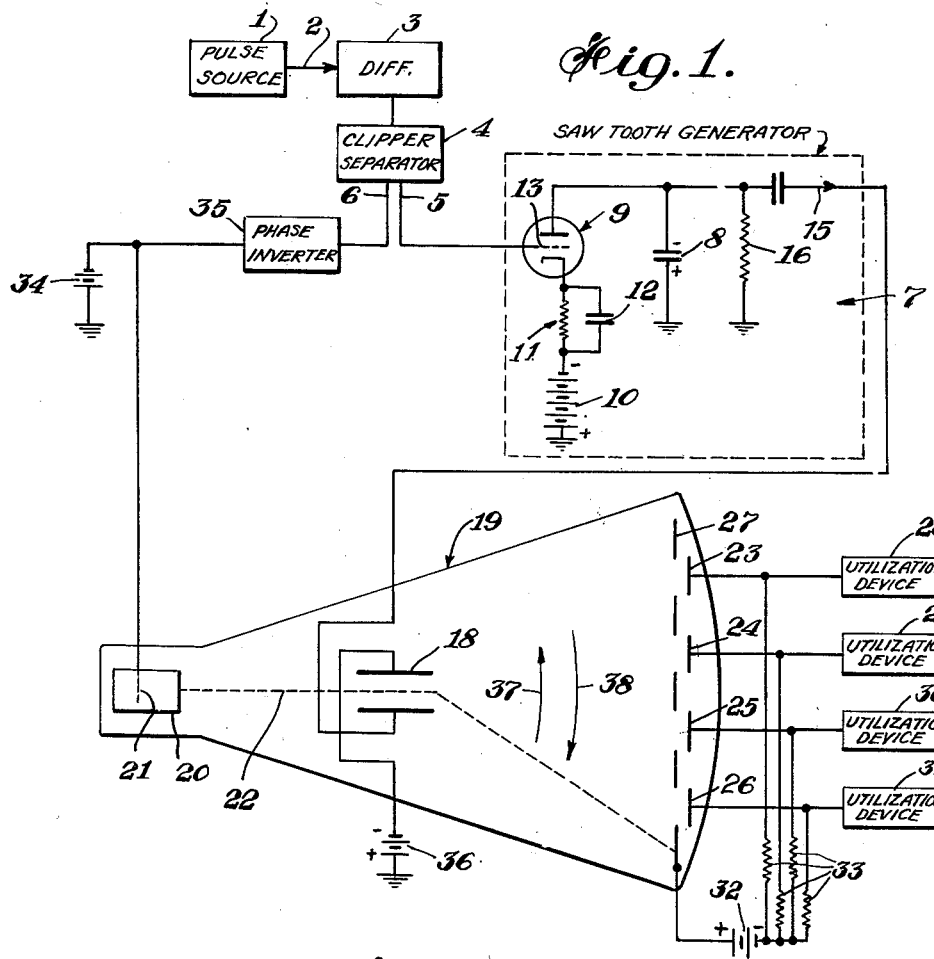
Fig. 1 is a schematic and block diagram of a pulse width separation system.
Figure 2:
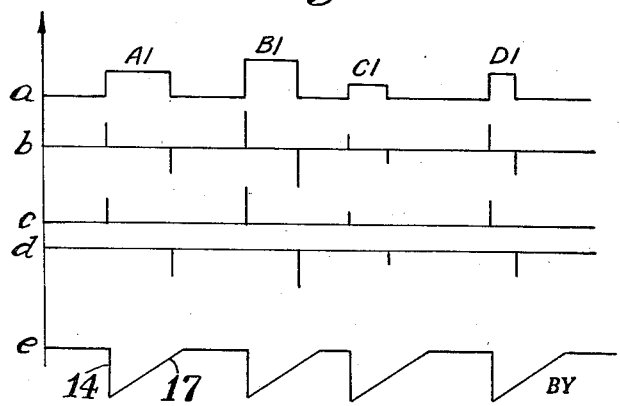
Fig. 2 is a set of curves used in explaining the operation of said system.

Referring now to Fig. 1, the pulses of curve $a$, derived from any suitable source 1, are applied via line 2 to a differentiator 3 at whose output there is produced a train of short pulses, such as indicated in curve $b$, the positive ones of which correspond to the leading edges of the pulses in curve $a$, and the negative ones of which correspond to the trailing edges of the pulses of curve $a$. These are fed to a clipper-separator 4 which clips the pulses along the axis sending the positive ones, as represented in curve $c$, out along line 5 and the negative ones, as represented in curve $d$, out along the line 6. Also the clipper preferably limits the positive pulses to a common amplitude. The positive pulses (curve $c$) are used to trigger a sawtooth generator 7 and for this purpose line 5 is connected to generator 7. The generator 7 may be a form of relaxation oscillator which is normally quiescent and is triggered by each positive pulse to produce a sawtooth pulse or pulse of sloping amplitude.

In the particular form of such generator illustrated in Fig. 1 a condenser 8 is adapted to be charged rapidly via an electron discharge vacuum tube 9 from a voltage source 10. Tube 9 is biased, by any suitable means such as biasing cathode resistor 11 in conjunction with condenser 12, to cut off. When, however, the incoming positive pulses are applied to the grid 13 of tube 9 via line 5 they each cause tube 9 to conduct and the condenser 8 is charged very rapidly producing the steep leading edge 14 (curve $e$) of a sawtooth pulse at the output terminal 15 of the oscillator. The condenser 8 then discharges slowly through a resistor 16 thereby producing the trailing edge 17 of each sawtooth pulse. The output of generator 7, therefore, consists of sawtooth pulses such as illustrated in curve $e$, the steep leading edge thereof coinciding with the positive pulses of curve $c$, and the corresponding leading edges of the varying width pulses of curve $a$. The sloping trailing edges of the sawtooth pulse are sufficiently long so as to extend in time beyond the trailing edges of the varying width pulses of curve $a$, so that the trailing edges of the varying width pulses of curve $a$ occur at some time during the sloping portion of their corresponding sawtooth pulses. The sawtooth pulses are applied to the deflection electrodes 18 of a cathode ray tube 19 having an electron gun 20 including a control element 21 for producing a beam 22, which beam is adapted to be deflected at different deflection angles by voltages applied to the deflection electrodes 18. A plurality of target elements 23—26, equal in number to the number of channels into which pulses are to be separated, are arranged so as to be struck by the beam at different deflection angles thereof. The target elements are arranged behind an aperture plate 27 having apertures exposing the target elements to the beam. The target elements may be secondary electron emitting electrodes and the aperture plate 27 serves as a common collector. Each of the target elements 23—26 may be connected to a separate utilization device 28—31 respectively. The various D. C. voltages required for the operation of the system may be obtained from a common source connected to a voltage divider. However, for the sake of simplicity of illustration a source 32 is indicated which makes the collector 27 positive with respect to the target elements and shows the connection of the various separating and load resistors 33. Likewise, D. C. voltage source 34 is shown applied to the grid 21 to normally maintain the beam turned off, and the beam is only turned on when one of the pulses of curve $d$, corresponding to the trailing edges of the varying width pulses of curve $a$, are applied thereto through phase inverter 35. Another D. C. voltage source 36 is used to apply a voltage to the deflection plates 18 so that the beam 22 is initially deflected toward one end of the aperture plate 27 and will not strike any of the target elements, it being understood that the beam is actually not turned on until a pulse is applied to the grid 21.

The system hereinabove described operates to separate pulses according to their width into different channels in the following manner. The positive pulses of curve $c$ each initiates a sawtooth pulse whose leading edge causes the beam to jump rapidly in the direction of arrow 37 to the opposite end of the aperture plate 27. The sloping trailing edge of the pulse causes the beam to sweep slowly backward in the direction indicated by arrow 38. The beam, however, is actually not turned on until the following pulse of curve $d$ (as inverted) is applied to the grid 21 of the electron gun, whereupon the beam flashes on and strikes the particular target element at which the beam is directed by the instant voltage of the sawtooth pulse. Thus, for example, the beam would strike target element 23 for pulse D1 since the trailing edge of pulse D1 would occur at a point close to the maximum value of the decaying sawtooth pulse. Pulse C1 which is of greater width would cause the beam to strike target element 24 since its trailing edge would occur at a later time with respect to the decay or downward sloping edge of its corresponding sawtooth pulse. Pulses B1 and A1 would cause the beam to strike target elements 25 and 26 respectively. It will thus be seen that the pulses would cause the beam to strike different target elements depending upon the width of each pulse, thereby producing output pulses for their separate utilization devices.

It is to be noted that the amplitude of the input pulses to the system illustrated in Fig. 1 does not affect the separation according to width. With regard to said system, it is apparent that a large number of channels may be separated, that the type of sweep is not necessarily confined to a linear sweep such as illustrated, and that the pulses of the different channels may arrive in any given order and with any time spacing and still be properly separated. The apertures of the aperture plate may be enlarged or diminished to provide less critical channel separation or on the other hand to provide a greater factor of safety with regard to crosstalk.

The clipper and pulse separator 4 may be of the double diode type with the diodes oppositely polarized so that pulses of one polarity pass through one diode and pulses of the other polarity pass through the other diode. The phase inverter is only required to insure that positive pulses are applied to turn on the beam and, where the system is such as to provide positive pulses suitable for this purpose without the use of the phase inverter, it will of course be omitted. It will also be apparent that, if only one channel is to be separated from the others, the output circuits of the other channels may be connected together.

While we have described above the principles of our invention in connection with specific apparatus, it is to be clearly understood that this description is made only by way of example and not as a limitation to the scope of said invention.

We claim:
1. A system for separating pulses according to their width comprising means for producing an electron beam, a plurality of target elements, deflecting means for deflecting the beam successively over said target elements, means responsive to the width of said pulses for controlling said deflecting means and said beam producing means to direct the beam at a given one of said target elements, and a separate output circuit for each of said target elements, said beam being normally cut off, and said controlling means including means for differentiating the incoming pulses to produce short pulses corresponding to the leading and trailing edges of each, means for separating the leading edge pulses from the trailing edge pulses, means for applying each of the leading edge pulses to initiate a sweep voltage, means for applying each of the sweep voltages to deflect the beam across the target elements, and means responsive to each of the trailing edge pulses to turn on the beam.

2. A system for separating pulses according to their widths comprising means for producing an electron beam, said beam being normally turned off, a plurality of target elements, deflecting means for deflecting the beam successively over said target elements, means responsive to the leading edge of each of said pulses for initiating the deflection of said beam, and means responsive to the trailing edge of each of said pulses for turning on the beam.

3. A system according to claim 2, further including means for differentiating the incoming pulses to produce short pulses corresponding to the leading and trailing edges of the incoming pulses, means for applying the short pulses corresponding to the leading edges of the incoming pulses to said deflecting means, and means for applying the short pulses corresponding to the trailing edges of said incoming pulses to said beam producing means.

JOSEPH FEINSTEIN.
IRWIN H. FRANZEL.

REFERENCES CITED

The following references are of record in the file of this patent:

UNITED STATES PATENTS

| Number | Name | Date |
|---|---|---|
| 2,204,055 | Skellett | June 11, 1940 |
| 2,224,677 | Hanscom | Dec. 10, 1940 |
| 2,236,134 | Gloess | Mar. 25, 1941 |
| 2,361,766 | Hadekel | Oct. 31, 1944 |
| 2,415,870 | De Ryder | Feb. 18, 1947 |
| 2,418,133 | Miller et al. | Apr. 1, 1947 |
| 2,427,500 | Houghton | Sept. 16, 1947 |
| 2,439,321 | Starr | Apr. 6, 1948 |
| 2,462,860 | Grieg | Mar. 1, 1949 |